(12) United States Patent
Duan et al.

(10) Patent No.: US 12,314,814 B2
(45) Date of Patent: May 27, 2025

(54) DUAL-TYPE QUBITS SYSTEM, QUANTUM NETWORK AND CONSTRUCTION METHOD THEREOF

(71) Applicant: Tsinghua University, Beijing (CN)

(72) Inventors: Luming Duan, Beijing (CN); Haoxiang Yang, Beijing (CN)

(73) Assignee: Tsinghua University, Beijing (CN)

( * ) Notice: Subject to any disclaimer, the term of this patent is extended or adjusted under 35 U.S.C. 154(b) by 746 days.

(21) Appl. No.: 17/450,565

(22) Filed: Oct. 12, 2021

(65) Prior Publication Data
US 2022/0129778 A1    Apr. 28, 2022

(30) Foreign Application Priority Data
Oct. 22, 2020  (CN) .......................... 202011139747.7
Jan. 7, 2021   (CN) .......................... 202110016452.9

(51) Int. Cl.
    *G06N 10/00*    (2022.01)
(52) U.S. Cl.
    CPC ................... *G06N 10/00* (2019.01)
(58) Field of Classification Search
    CPC .................................................... G06N 10/00
    USPC ....................................................... 716/100
    See application file for complete search history.

(56) References Cited

U.S. PATENT DOCUMENTS

| 4,592,064 | A | 5/1986 | Silfvast | |
|---|---|---|---|---|
| 9,858,531 | B1* | 1/2018 | Monroe | G06N 10/00 |
| 10,733,524 | B1* | 8/2020 | Feig | G06N 10/00 |
| 2003/0098980 | A1* | 5/2003 | Dress | G02F 1/39 |
| | | | | 356/484 |
| 2007/0252081 | A1* | 11/2007 | Munro | B82Y 10/00 |
| | | | | 250/281 |
| 2008/0258049 | A1 | 10/2008 | Kuzmich et al. | |
| 2009/0213890 | A1 | 8/2009 | Patel et al. | |
| 2019/0138928 | A1 | 5/2019 | Monroe et al. | |
| 2022/0222567 | A1* | 7/2022 | Reagor | G06N 10/40 |
| 2023/0018922 | A1* | 1/2023 | Sage | G21K 1/003 |
| 2023/0122145 | A1* | 4/2023 | Uys | G06N 10/40 |
| | | | | 250/492.1 |
| 2023/0260777 | A1* | 8/2023 | Wang | G21K 1/00 |

(Continued)

FOREIGN PATENT DOCUMENTS

| CN | 102593694 A | 7/2012 |
|---|---|---|
| CN | 105553569 A | 12/2015 |

(Continued)

OTHER PUBLICATIONS

Qiang, Zhou et al., "Experimental Study on Spectral Multiplexed Quantum Channel at Telecom Band," University of Electronic Science and Technology of China, Chengdu 610054 (2019).

(Continued)

Primary Examiner — Jack Chiang
Assistant Examiner — Suchin Parihar

(57) ABSTRACT

A dual-type qubit system, a quantum network based on the dual-type qubit system and a construction method thereof are provided. The dual-type qubit system includes two types of qubits. The two types of qubits, with different functions, are implemented by the same species of ions. The ion has at least two sets of long-lived energy levels. The two types of qubits, carried by spectrally different sets of long-lived energy levels of the ions, are convertible to each other.

20 Claims, 12 Drawing Sheets

(56) References Cited

U.S. PATENT DOCUMENTS

2024/0119337 A1* 4/2024 Xu .................. H03K 17/92
2024/0289665 A1* 8/2024 Pichler ............. G06N 10/20

FOREIGN PATENT DOCUMENTS

| CN | 107272299 A | 10/2017 |
| CN | 108923258 A | 11/2018 |
| CN | 109379144 A | 2/2019 |
| CN | 109982410 A | 7/2019 |
| CN | 111919227 A | 11/2020 |
| DE | 2365502 A1 | 5/1975 |

OTHER PUBLICATIONS

Blinov, B. B., et al., "Observation of entanglement between a single trapped atom and a single photon," Nature, vol. 428, Mar. 11, 2004.

Gujarati, Tanvi P., et al., "Intrinsic retrieval efficiency for quantum memories: A three-dimensional theory of light interaction with an atomic ensemble," Physical Review A 97 (2018).

Xu, Wenling, et al., "High dimensional quantum logic gates and quantum information processing," China Academic Journal Electronic Publishing House (1994-2019).

You-Liang, Tang, et al., "Teleportation of the M-particle entangled state by using one entangled state," Department of Physics, Human Normal University, Changsha 410081, China (2008).

First Office Action issued by China Patent Office, CN Patent Application No. 202110016452.9, issued Sep. 15, 2021.

Notification of Grant, CN Patent App. 202110016452.9, Feb. 11, 2022 (5 pages).

\* cited by examiner

DUAL-TYPE QUBITS SYSTEM, QUANTUM NETWORK AND CONSTRUCTION METHOD THEREOF

CROSS-REFERENCE TO RELATED APPLICATIONS

This application claims the priorities of Chinese patent application No. 202011139747.7 filed with CNIPA on Oct. 22, 2020 and Chinese patent application No. 202110016452.9 filed with CNIPA on Jan. 7, 2021, the contents of which are incorporated herein by reference.

TECHNICAL FIELD

Embodiments of the present disclosure relate to but are not limited to, quantum information technology, in particular to a dual-type qubit system, a quantum network based on the dual-type qubit system, a method for constructing the quantum network.

BACKGROUND

A dual-type qubit system consists of two types of qubits, which include different types of qubits performing different functions. For example, one type qubits, we may call them as ancillary qubits, can be used to perform operations, including, but not limited to, photon assisted entanglement generation, repetitive error syndrome measurement; the other type qubits, we may call them as data qubits, can be used to protect qubit coherence from disruptive operations.

With spectral separation between different types of qubits, dual-type qubit system is useful to eliminate crosstalk error in trapped ion systems. Crosstalk errors refer to errors caused by disturbance of some qubits on other qubits in a multi-qubits system. For example, as shown in FIG. 1, when a certain qubit Qa' is subjected to operations such as measurement and cooling, photons emitted by the qubit Qa' are absorbed by neighboring qubit Q1' and Q2', which triggers decoherence and leads to loss of information on the neighboring qubit Q1' and Q2' if the qubits are identical (i.e., belong to the same species of ions and at the same state).

Crosstalk error is a major difficulty in quantum computing, quantum network, precision measurement and other fields. For example, these fields require qubits to be at extremely low temperature, thus continuous cooling is necessary, however, the cooling process is dissipative, which leads to information loss. A practical cooling method is sympathetic cooling, in which ancillary qubits are laser cooled, and data qubits are sympathetic cooled mediated by the interplay between ancillary qubits and the data qubits. If the ancillary qubits and the data qubits are identical (i.e. belong to a same ion species and at a same state), the cooling operation on the ancillary qubits will cause crosstalk errors on the nearby data qubits. For another example, most quantum error correction schemes rely on repetitive measurement of ancillary qubits, which will also cause decoherence on nearby data qubits and leads to failure of the quantum computing process.

A quantum network is an important ingredient in the field of quantum information. Quantum information is an interdisciplinary application of quantum mechanics and information science. Quantum entanglement helps to realize secure quantum communication absent in classical communication, and quantum computing with capacity far beyond the classical computing. Quantum networks are mainly divided into two categories. The first is quantum communication networks, the main goal of which is to achieve secure communication. The second is quantum computing network, which is one of the practical ways to enlarge the size of the quantum computing platform. Quantum computing has an exponential speed-up over classical computing on certain problems and therefore has attracted much attention. However, the current quantum computing platforms are facing the bottleneck of insufficient scalability. Building quantum network, which combines discrete quantum computing nodes, can significantly increase the size of the system and help to achieve large-scale quantum computing.

FIG. 2 is a diagram of a quantum network. As shown in FIG. 2, the quantum network includes quantum nodes and quantum channels. Each quantum node contains at least one qubit carrying quantum information and at least one qubit for establishment of entanglement links between quantum nodes. Systems with long coherence time are ideal platforms for quantum nodes, for example, trapped ions, diamond nitrogen vacancy center systems etc. Quantum channels are in charge of quantum information transmission. Optical photon is good candidate for information carrier since it can carry information at high speed and optical fibers provide a practical way to guide photons with little disturbance. The entanglement links between quantum nodes is essential to build a quantum network. Entanglement links between quantum nodes means the entanglement between the ancillary qubits included in the corresponding quantum nodes. FIG. 3 is a schematic diagram of establishing an entanglement link between quantum nodes. As shown in FIG. 3, to entangle ion A (an ancillary cubit) in Quantum Node 1 and ion B (an ancillary qubit) in Quantum Node 2, the entanglement between ion A and Photon 1 and that between ion B and Photon 2 are constructed first, then the photon state of Photon 1 and Photon 2 are jointly measured (for example, by subjecting Photon 1 and Photon 2 to interfere on a non-polarizing beam splitter), and these procedures (including ion-photon entanglement generation and joint measurement) are repeated until the entanglement between ion A and ion B is successfully constructed, which is heralded by certain outcome of the joint measurement. The construction of the entanglement between ions and photons in quantum nodes is a necessary step for building a quantum network. The entanglement between ions and photons are realized by different methods on different physical platforms. FIGS. 4 and 5 are schematic diagrams of entangling ions and photons. In the two schemes of ion-photon entanglement generation, the ion is excited by laser light to the upper energy level|e⟩. Then the ion spontaneously decays to the lower energy levels with photon emitted. The emitted photon has different states as the ion decays back to different energy levels, thus the ion-photon entanglement is realized. In FIG. 4, photonic frequency states are entangled with ion states, and in FIG. 5, the photonic polarization states are entangled with ion states. For example, the ion-photon entangled state in FIG. 4 can be expressed as $|\uparrow\rangle|v_\uparrow\rangle+|\downarrow\rangle|v_\downarrow\rangle$, $|\uparrow\rangle$ and $|\downarrow\rangle$ representing the ion state and $|v_\uparrow\rangle$ and $|v_\downarrow\rangle$ representing the photon state in the degree of frequency. The emitted photons are collected as information carrier, and are used to construct the entanglement links between quantum nodes, as described above. Because the success probability of the entanglement (between quantum nodes) generation is much smaller than one, the near resonance excitation on ancillary qubits will be repeated a lot of times with resonant photons emitted. If the data qubits and the ancillary qubits are identical, this process will cause uncorrectable crosstalk errors on the data qubits, resulting in quantum information loss.

SUMMARY

The following is a summary of the subject matters described in detail herein. This summary is not intended to limit the scope of protection of the claims.

An embodiment of the present disclosure provides a dual-type qubit system which includes first-type qubits and second-type qubits, wherein the first-type qubits and the second-type qubits, with different functions, are implemented by a same species of ions, the ions have at least two sets of long-lived energy levels; the first-type qubits and the second-type qubits, carried by different sets of long-lived energy levels of the ions, are coherently convertible to each other.

In an exemplary embodiment, the ions at different sets of long-lived energy levels have different excitation and emission frequencies. The different excitation and emission frequencies have a frequency difference larger than 20 GHz.

In an exemplary embodiment, in the dual-type qubit system, the first-type qubits are ancillary qubits, and the second-type qubits are data qubits.

In an exemplary embodiment, at least one set of the long-lived energy levels are operational levels and at least one other set of the long-lived energy levels are storage levels.

In an exemplary embodiment, the ions implementing ancillary qubits are on the operational levels and perform operations which include, laser cooling, qubit state preparation and detection, quantum gates, and photon assisted entanglement generation; the ions implementing data qubits are on the storage levels, decoupled from the operations, and protect coherence of data qubits from disruptive operations.

In an exemplary embodiment, when ancillary operations are performed on the ancillary qubits, the ions implementing ancillary qubits include ions for performing ancillary operations and the ions implementing data qubits include ions for carrying quantum information; and between the ancillary operations, the data qubits and the ancillary qubits are coherently convertible to each other through laser transitions between the storage levels and the operational levels.

In an exemplary embodiment, the ions are ytterbium-171 ions.

In an exemplary embodiment, the ions are ytterbium ions, or calcium ions, or barium ions, or their isotopes.

In an exemplary embodiment, for the ytterbium-171 ions, the two sets of long-lived energy levels are the ground-state levels $^2S_{1/2}$ and the metastable levels $^2F_{7/2}$, respectively.

In an exemplary embodiment, for the ytterbium ions, the ground-state levels $^2S_{1/2}$ are the operational levels and the metastable levels $^2F_{7/2}$ are the storage levels.

An embodiment of the present disclosure further provides a method for constructing a quantum network. The method includes:

setting two sets of long-lived energy levels of an ion having at least two sets of long-lived energy levels to be operational levels and storage levels respectively; and constructing a quantum network using the iotas on the operational levels and the ions on the storage levels.

The long-lived energy levels have lifetimes longer than a first preset multiple of a time scale for quantum operations, and each set of the long-lived energy levels include at least two sublevels for encoding quantum information.

In an exemplary embodiment, constructing the quantum network using the ions on the operational levels and the ions on the storage levels includes:

establishing entanglement links between quantum nodes using the ions on the operational levels, which carry ancillary qubits.

During the establishment of the entanglement links, the ions carrying quantum information are at the storage levels, which carry data qubits, for protection.

In an exemplary embodiment, establishing the entanglement links between the quantum nodes using the ions on the operational levels includes:

generating entangled states between the ions at the operational levels and photons repetitively; and jointly measuring interference of the photons emitted from the quantum nodes to be linked.

In an exemplary embodiment, before establishing the entanglement links between quantum nodes using the ions on the operational levels, the method further includes:

coherently transferring the ions carrying quantum information to the storage levels.

In an exemplary embodiment, the excitation and emission frequency difference between the operational levels and the storage levels is larger than a second preset multiple of a reciprocal of the quantum operational time scale.

An embodiment of the present disclosure further provides a quantum network, which includes quantum nodes and quantum channels;

wherein the quantum nodes includes:

at least one ion for establishing entanglement links between quantum nodes and at least on ion carrying quantum information.

the at least one ion for establishing the entanglement links are at the operational levels during the establishment of the entanglement links; and the at least one ion carrying quantum information are at the storage levels during the establishment of the entanglement links.

The operational levels and the storage levels are two sets of long-lived energy levels of the same species of ions. The ions have at least two sets of long-lived energy levels, and are coherently transferrable between different sets of long-lived energy levels. The operational levels carry ancillary qubits, and the storage levels carry data qubits. The long-lived energy levels have lifetimes longer than a first preset multiple of a time scale for quantum operations. Each set of the long-lived energy levels include at least two sublevels for encoding quantum information. The excitation and emission frequency difference between the operational levels and the storage levels is larger than a second preset multiple of a reciprocal of the quantum operational time scale.

Other features and advantages of the present disclosure will be set forth in the specification which follows, and in part will be apparent from the specification, or will be learned by practice of the present disclosure. The objects and other advantages of the present disclosure can be implemented and obtained by the structures particularly indicated in the specification, claims and drawings.

Other aspects will become apparent upon reading and understanding of the drawings and the detailed description.

BRIEF DESCRIPTION OF DRAWINGS

The drawings are used to provide a further understanding of technical solutions of the present disclosure, and constitute a part of the specification. They are, together with the embodiments of this application, used for explaining the technical solutions of the present disclosure and do not constitute any limitation on the technical solutions of the present disclosure.

DETAILED DESCRIPTION

Figure 1:
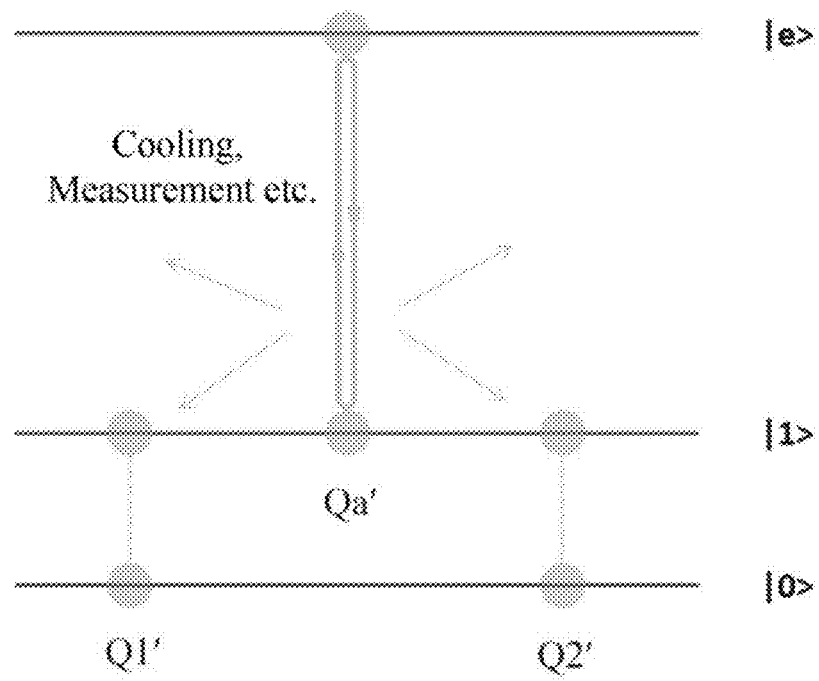
FIG. 1 is a schematic diagram of crosstalk errors.
Figure 2:
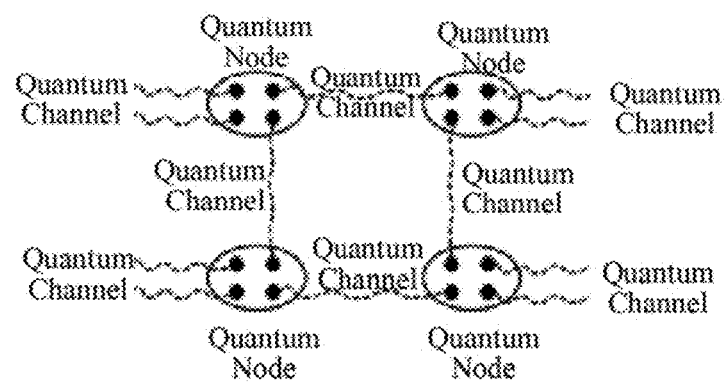
FIG. 2 is a structural diagram of a quantum network.
Figure 3:
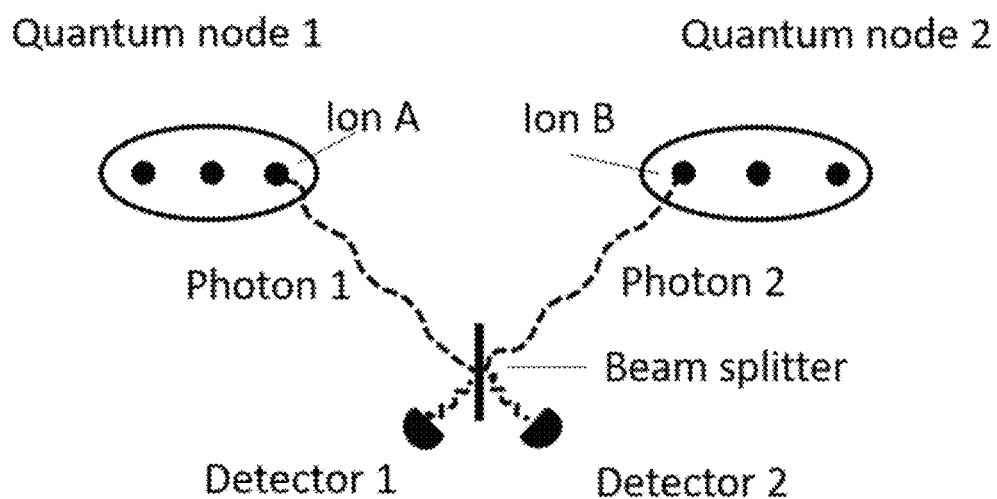
FIG. 3 is a schematic diagram of establishing entanglement links between quantum nodes.
Figure 4:
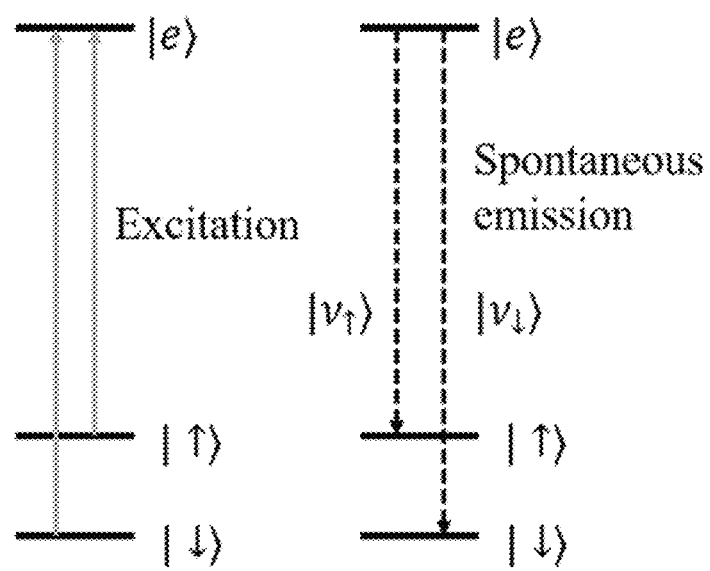
FIG. 4 is a schematic diagram of ion-photon entanglement generation.
Figure 5:
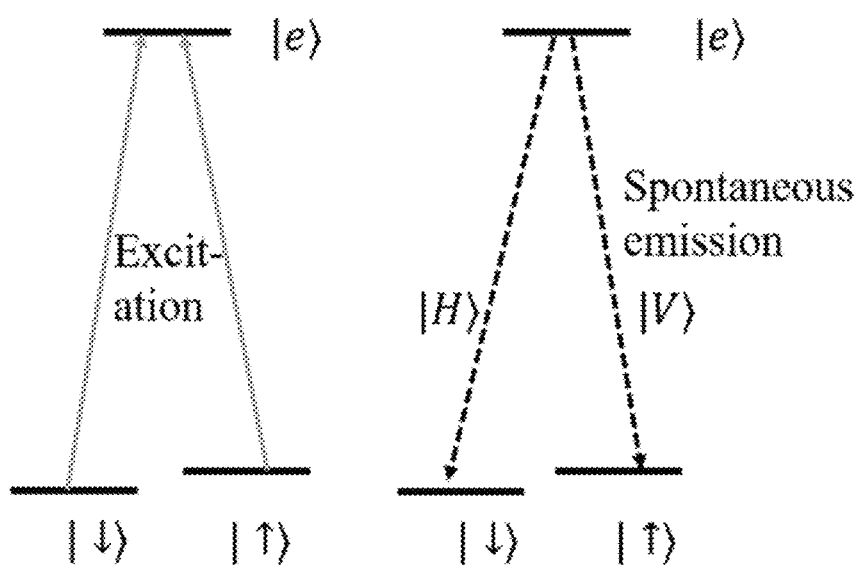
FIG. 5 is another schematic diagram of ion-photon entanglement generation.

Hereinafter, embodiments of the present disclosure will be described in detail with reference to the drawings. The following embodiments serve to illustrate the present disclosure rather than being intended to limit the scope of the present disclosure. The embodiments in this application and the features in the embodiments can be random combined with each other if there is no conflict.

In the description of the present invention, it should be understood that, terms "center", "longitudinal", "transverse" "length", "width", "thickness", "upper", "lower", "front", "rear", "left", "right", "vertical", "horizontal", "top", "bottom", "inner", "outer", "clockwise", "counterclockwise", "axial", "upper", "radial", "circumferential" and the like are only for ease of description of the present invention, instead of indicating or implying that the referred device or element roust have a specific orientation or must be constructed and operated in a specific orientation. Therefore, these terms should not be understood as limitations on the present invention.

In addition, the terms "first" and "second" are only used for descriptive purposes, and should be understood as indicating or implying relative importance or as implicitly indicating the number of indicated technical features. Therefore, a feature defined with "first" and "second" may indicate explicitly or implicitly inclusion of at least one of the feature. In the description of the present invention, "plurality" means at least two, such as two, three, etc., unless otherwise explicitly defined.

In the present invention, unless otherwise specified or defined, terms "install", "connect", "coupl" and "fix" should be understood in their broadest senses. For example, unless otherwise explicitly defined, a connection may he a fixed connection, a detachable connection or an integrated connection, a mechanical connection or an electrical connection, it may be a direct connection or an indirect connection via an intermediary and it may be an internal connection between the two elements or an interaction between two elements. Those of ordinary skills in the art may understand meanings of the above terms in the present invention according to situations.

In the present invention, unless otherwise specified or limited, a first feature being "on" or "under" a second feature may mean that the first feature is in direct contact with the second feature, or that the first feature and the second feature are in indirect contact via an intermediary. Furthermore, the first feature being "above", "over" and "on" the second feature may mean that the first feature is right above or obliquely above the second feature or may only mean that the first feature is disposed higher than the second feature. The first feature being "below", "under" and "underneath" the second feature may mean that the first feature is directly below or obliquely below the second feature or may only mean that the first feature is disposed lower than the second feature.

In the specification, describing an embodiment or example with terms "an embodiment", "some embodiments", "an example", "a specific example", or "some examples" means that specific feat res, structures, materials or characteristics described in connection with this embodiment or example are included in at least one embodiment or example of the present invention. In this specification, the above terms do not necessarily refer to the same embodiments or examples. Furthermore, the specific features, structures, materials or characteristics described may be combined in any one or more embodiments or examples in a suitable manner. In addition, those skilled in the art can integrate and combine different embodiments or examples and features of different embodiments or examples described in this specification if there is no conflict.

The steps shown in the flowcharts of the drawings may be performed in a computer system that can execute computer-executable instructions. Moreover, although a logical order is shown in the flowcharts, in some cases, the steps shown or described may be performed in a different order from that shown here.

Figure 6:
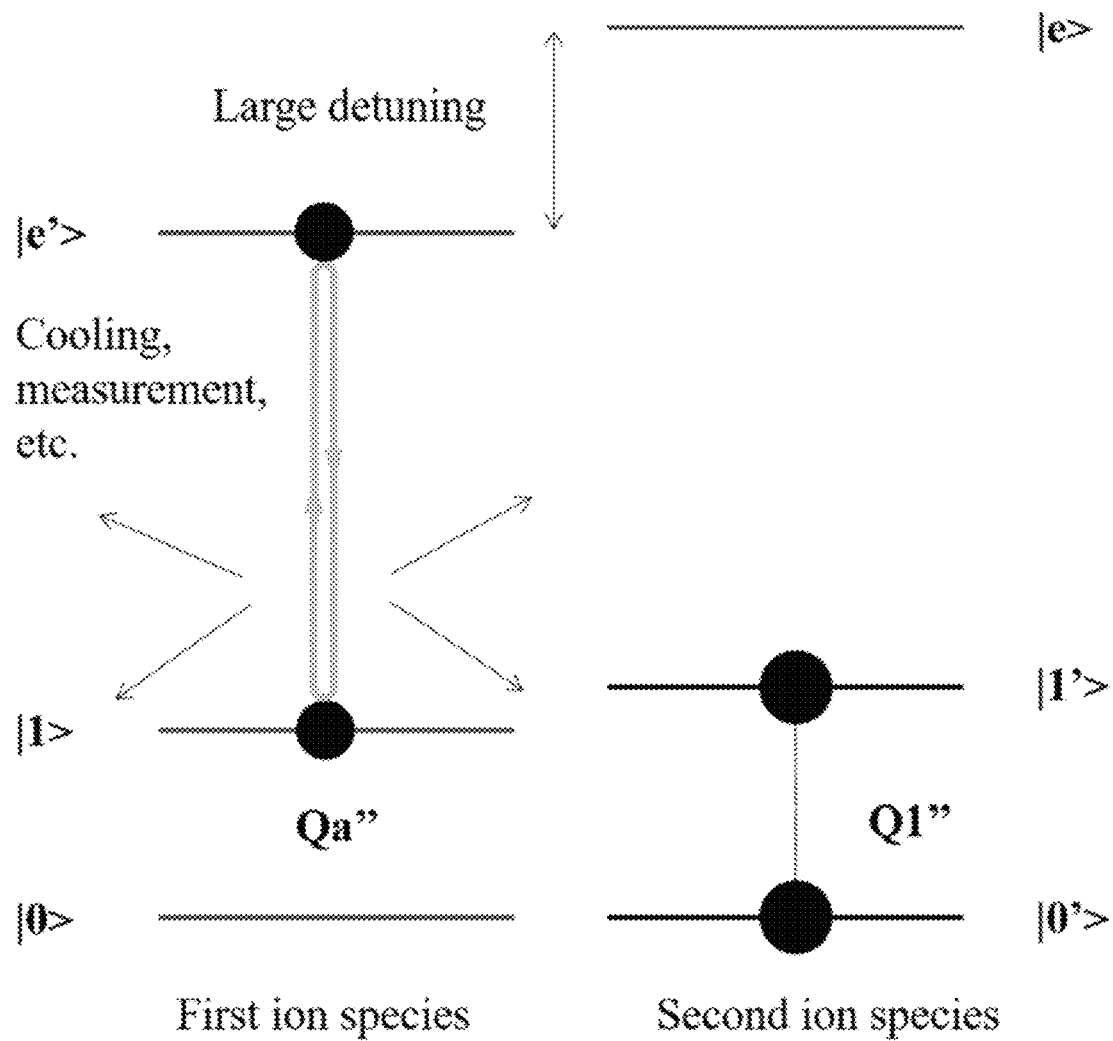
FIG. 6 is a schematic diagram of using different types of ions to eliminate crosstalk errors.

There are two widely used methods to avoid crosstalk errors: 1. Using different ion species to implement data qubits and ancillary qubits. As shown in FIG. 6, ancillary qubit Qa" and data qubit Q" are ions of different species, thus the data qubits and the ancillary qubits have different energy level structures, and the excitation and emission frequencies of the data qubits and ancillary qubits are so different that they will not affect each other. This method greatly increases the complexity of a quantum computing system, reduces the fidelity of a quantum logic gate between ancillary qubits and data qubits, and has the problem that the two different types of qubits have random and uncontrollable positions. 2. Moving qubits spatially to increase the spatial distance between the ancillary qubits and the data qubits so as to reduce mutual influence between ancillary qubits and data qubit. In this method, the movement of qubits may cause heating and thus, reduces system performance or make it necessary to introduce additional cooling operations.

To sum up, operations on part of the identical qubits will cause crosstalk errors. The current crosstalk error-avoiding methods have many drawbacks and are not conducive to large-scale quantum computing and quantum network implementation, or they lack scalability.

The present disclosure provides the following technical solution:

An embodiment of the present disclosure provides a novel dual-type qubit system, and the novel dual-type qubit system according to the embodiment of the present disclosure will be described below with reference to FIGS. 7-9.

The novel dual-type qubit system according to some embodiments of the present disclosure includes the first-type qubits and the second-type qubits with different functions. The first-type qubits and the second-type qubits are implemented by the same species of ions. The ions have at least two sets of long-lived energy levels; the first-type qubits and the second-type qubits, carried by different sets of long-lived energy levels of the ions, are coherently convertible to each other.

Here, the ions implement a certain type of qubits means the ions are at the long-lived energy levels carrying this type of qubits. In other words, the first-type qubits and the second-type qubits are the same species of ions at different sets of long-lived energy levels. The coherent conversion between the qubit types means the ions can be coherently transferred between the different sets of long-lived energy levels which carry the different types of qubits.

In an exemplary embodiment, the conversion between the first type qubits and the second-type qubits does not involve spatial movement or increase of inter-ionic distance, thus avoiding introducing additional heating mechanism and affecting the interaction strength between the ions.

In the novel dual-type qubit system, the first-type qubits and the second-type qubits are implemented by the same species of ions, there is no mass mismatch therein, thus the system complexity is lower and the gate fidelity between different qubit types is higher compared with the dual-type qubit system implemented by two ion species.

According to some embodiments of the present disclosure, the ions at different sets of long-lived energy levels have different excitation and emission frequencies. Different frequencies are defined as those with frequency difference larger than 20 GHz (Giga Hertz). In other words, the different types of qubits are carried by spectrally separated sets of long-lived energy level. Because the huge frequency difference, operations on one type of qubits will not affect the other type of qubits, thus crosstalk error is eliminated.

Therefore, according to the novel dual-type qubit system of the embodiment of the present disclosure, the coherently convertible two types of qubits are carried by spectrally separated sets of long-lived energy levels of the same species of ions so as to efficiently eliminate crosstalk error and prevent information loss without significantly increase the complexity of system, which is conducive to the implementation of large-scale quantum computing.

According to some embodiments of the present disclosure, the first-type qubits are ancillary qubits, and the second-type qubits are data qubits.

According to some embodiments of the present disclosure, at least one set of the long-lived energy levels are operational levels and at least one other sets of the long-lived energy levels are storage levels.

According to some embodiments of the present disclosure, the ions implementing ancillary qubits are on the operational levels and perform operations which include, laser cooling, qubit state preparation and detection, quantum gates, and photon assisted entanglement generation; the ions implementing data qubits are on the storage levels, decoupled from the operations, and protect coherence of data qubits from disruptive operations.

In other words, the operations on the ions on the operational levels (ancillary qubits) will not disturb the ions on the storage levels (data qubits), thus crosstalk error is suppressed.

According to some embodiments of the present disclosure, when ancillary operations are performed on the ancillary qubits, the ions implementing ancillary qubits include ions for performing ancillary operations and the ions implementing data qubits include ions for carrying quantum information; and between the ancillary operations, the data qubits and the ancillary qubits are coherently convertible to each other through laser transitions between the storage levels and the operational levels.

In other words, the ions used for ancillary operations are at the operational levels and the ions carrying quantum information are at the storage levels when we perform the ancillary operations on the operational levels. The ancillary operations include, but are not limited to, ion-photon entanglement generation, error syndrome measurement, sympathetic cooling.

According to some embodiments of the present disclosure, the ions are ytterbium −171 ions ($^{171}$Yb+), which have a long-lived ground state energy level $^2S_{1/2}$ and a long-lived metastable state energy level $^2F_{7/2}$, with the ground state energy level $^2S_{1/2}$ as the operational levels and the metastable state energy level $^2F_{7/2}$ as the storage levels.

According to some embodiments of the present disclosure, the ions include ytterbium ions, calcium ions or barium ions, or their isotopes.

Figure 7:
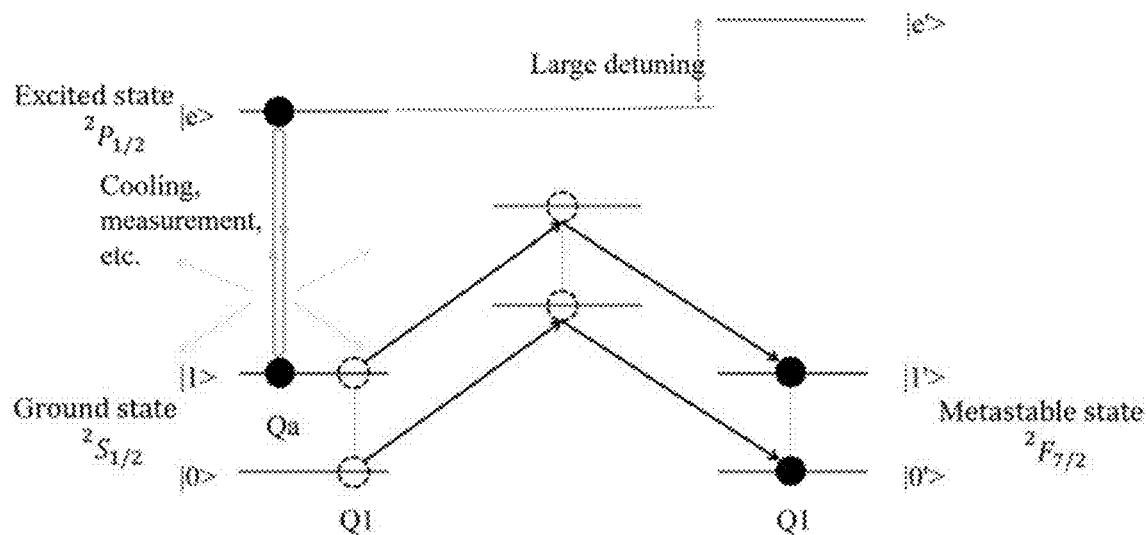
FIG. 7 is a schematic diagram of transferring ions to metastable energy levels according to an exemplary embodiment of the present invention.
Figure 8:
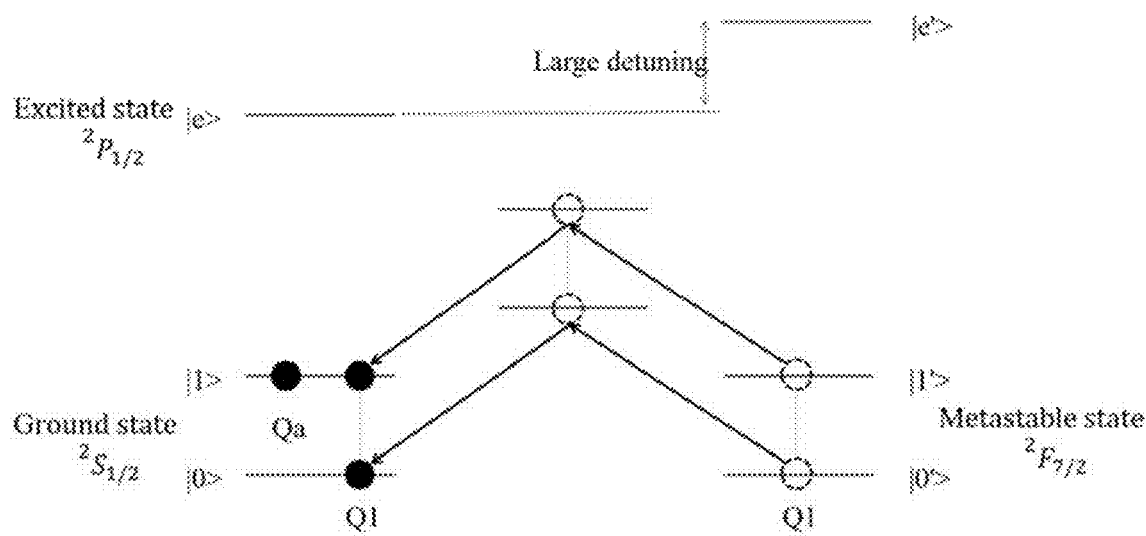
FIG. 8 is a schematic diagram of transferring ions to ground state energy levels according to an exemplary embodiment of the present invention.

In an exemplary embodiment, FIGS. 7 and 8 illustrate a scheme of dual-type qubit system based on the same species of ions. The operational levels carrying ancillary qubits and storages levels carrying data qubits are two spectrally separated sets of long-lived energy levels of the same species of ions. In the embodiments of the present disclosure shown in FIGS. 8 and 9, the ancillary qubits are carried by long-lived ground state energy levels $^2S_{1/2}$ of $^{171}$Yb+, which is chosen to be the operational levels, the data qubits are carried by long-lived metastable energy levels $^2F_{7/2}$ of $^{171}$Yb+, which is chosen to be the storage levels. The ions can be coherently transferred between the operational levels and the storage levels, thus the two types of qubits are convertible to each other. The operational levels and the storage levels are spectrally separated, thus the operations on ancillary qubits will not disturb the data qubits.

FIGS. 7 and 8 give the examples of the coherent conversion between qubit types. The conversion between qubit types means the ions can be coherently transferred between the different sets of long-lived energy levels carrying the different types of qubits, FIG. 7 gives an example of the conversion from ancillary qubit to data qubit: the ion on the operational levels is coherently transferred to storage levels via laser transitions between the storage levels and operational levels. FIG. 8 gives an example of the conversion from data qubit to ancillary qubit: the ion on the storage levels is coherently transferred to the operational levels via laser transitions between the storage levels and operational levels.

As illustrated in FIG. 7 and FIG. 8, according to some embodiments of the present disclosure, to maintain the coherence during the qubit type conversion, the two transition paths for the two basis states of the qubit ($|0\rangle \leftrightarrow |0'\rangle$ and $|1\rangle \leftrightarrow |1'\rangle$) should be driven simultaneously, which can be achieved by using two tones of a narrow-band transfer laser, where $\{|0\rangle, |1\rangle\}$ and $\{|0'\rangle |1'\rangle\}$ represent the qubit basis for the two types of qubits respectively. The coherent conversion means the ions can be transferred between quantum state $\alpha|0\rangle + \beta|1\rangle$ and $\alpha|0'\rangle + \beta|1'\rangle$ with superposition coefficients $\alpha$ and $\beta$ unchanged. The simultaneous conversion is robust against optical phase fluctuation, and can be implemented by a transfer laser phase-modulated by an electro-optical modulator (EOM). The EOM can generate two frequency sidebands locating symmetrically about the center frequency of the transfer laser and the two frequency sidebands have the same optical power, by properly setting the frequency of the RF (radio frequency) signal driving the EOM, the simultaneous conversion can be achieved.

Figure 9:
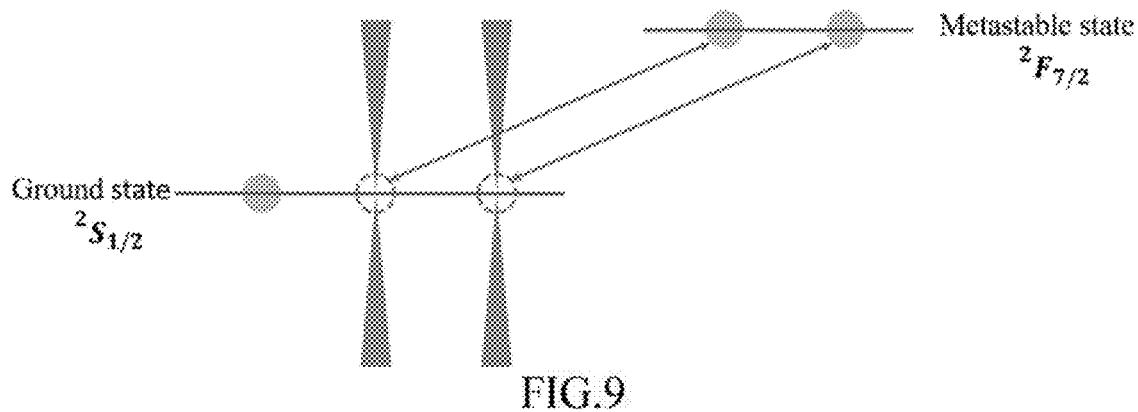
FIG. 9 is a schematic diagram of using an individual addressing technique to select positions for transferred ions on demand among multiple qubits according to an exemplary embodiment of the present invention.

As shown in FIG. 9, according to some embodiments of the present disclosure, the quantities and positions of the ancillary qubits and the data qubits can be dynamically tuned as demand by using individual addressing technology. Individual addressing means to focus the transfer laser so that its effective spot site covers only one ion, thus can transfer a single ion without affect the others. Therefore, the novel dual-type qubit system of the embodiment of the present disclosure is flexible.

The novel dual-type qubits system according to the embodiment of the present disclosure can promote the development of quantum networks, quantum computation, quantum precision measurement and other fields.

The present disclosure further provides a quantum network based on the above dual-type qubit system. The quantum network includes quantum nodes and quantum channels. The quantum node includes at least two ions implementing the novel dual-type qubits. The ancillary qubits, carried by the operational levels, are used for establishing photon assisted entanglement links between quantum nodes, and the data qubits, carried by the storage levels, are used to protect the coherence of qubits from the disruptive operations on the ancillary qubits. In other words, the ions used for establishment of entanglement links between quantum nodes are on the operational levels, and the ions carrying quantum information are on the storage levels, during the establishment of the entanglement links between quantum nodes. Because the data qubits and ancillary qubits are spectrally separated, the crosstalk error on the data qubits induced by the operations on the ancillary qubits is efficiently eliminated.

To sum up, the present disclosure provides a novel dual-type qubit system. Different types of qubits, carried by spectrally separated sets of long-lived energy levels of the same ion species, are coherently convertible to each other. The present disclosure can efficiently eliminate crosstalk errors without significantly increasing system complexity, and further provides the following advantages: high degree of flexibility-the positions and amounts of different types of qubits can be dynamically tuned on demand, high fidelity of quantum gates between different types of qubits.

It should be noted that the ions exemplified in the above implementations only serve as examples for the sole purpose of explaining the feasibility of the present disclosure and should not be understood as a limitation on the present disclosure. The ions in the novel dual-type qubits system according to the present disclosure may be Ytterbium-171 ions but the system is also applicable to other ions. In addition, although examples of parameters including specific values are provided herein, it should be understood that the parameters do not have to be exactly equal to the corresponding values and may be approximate to the corresponding values within an acceptable error tolerance or design constraints. And, the way of qubit type conversion set forth in the above embodiment is only exemplary for the sole purpose of illustrating the feasibility of the present disclosure and should not be understood as a limitation on the present disclosure. The way of qubit type conversion is any form known to those of ordinary skills in the art. The embodiments described with reference to the drawings are exemplary and serve the sole purpose of explaining the present disclosure, and should not be understood as a limitation on the present disclosure.

The present disclosure further provides a method for constructing a quantum network.

Figure 10:
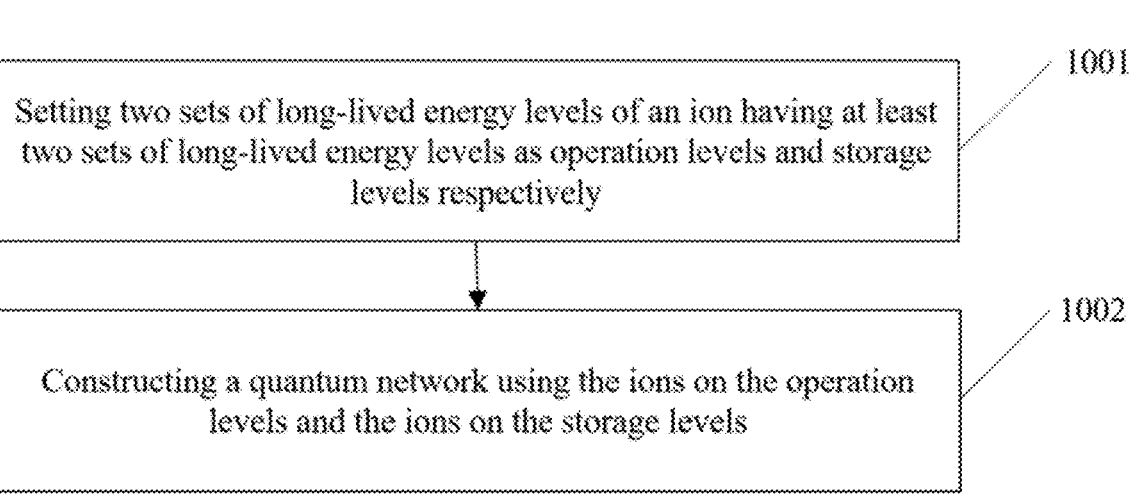
FIG. 10 is a flowchart of a method for constructing a quantum network according to an embodiment of the present disclosure.

FIG. 10 is a flowchart of a method for constructing a quantum network according to an embodiment of the present disclosure. As illustrated by FIG. 10 the method includes the following steps:

S1001, setting two sets of long-lived energy levels of an ion having at least two sets of long-lived energy levels as operational levels and storage levels respectively.

The long-lived energy levels include energy levels with an energy level lifetime longer than a first preset multiple of a time scale for quantum operations. Each set of the long-lived energy levels include at least two sublevels for encoding quantum information.

In an exemplary embodiment, the first preset multiple of the time scale for quantum operations is one millisecond.

In an exemplary embodiment, the operational levels and the storage levels are spectrally separated, that is, the excitation and emission frequency between operational levels and storage levels are different, with frequency difference larger than a second preset multiple of a reciprocal of the quantum operational time scale. Because of the spectral separation between the operational levels and the storage levels, the crosstalk between the ions on the operational levels and the storage levels will be significantly suppressed. In addition, the ions in the embodiment of the present disclosure can be coherently transferred between the operational levels and the storage levels. That is, the coherence is retained during the transfer.

In an exemplary embodiment, the second preset multiple of a reciprocal of the quantum operational time scale is 20 GHz.

S1002: constructing a quantum network using ions on the operational levels and the ions on the storage levels.

Because the ions have completely different excitation and emission frequencies at the storage levels and at the operational levels, photons excited and emitted by ions at the operational levels do not affect ions at the storage levels. Therefore, crosstalk errors will be suppressed.

In an exemplary embodiment, constructing the quantum network using the ions on the operational levels and the ions on the storage levels according to the embodiment of the present disclosure includes:

establishing entanglement links between the quantum nodes using the ions on the operational levels, which carry ancillary qubits.

During the establishment of the entanglement links, the ions carrying quantum information are at the storage levels, which carry data qubits, for protection.

In other words, the operational levels are used for establishment of entanglement links between the quantum nodes, and the storage levels are used for protection the coherence of ions carrying quantum information. During the establishment of the entanglement links, the ions used for entanglement links and the ions carrying quantum information are at different sets of long-lived energy levels, thus the crosstalk error is suppressed.

In an exemplary embodiment, establishing the entanglement links between the quantum nodes using the ions at the operational levels according to the embodiment of the present disclosure includes:

generating entangled states between ions at the operations levels and photons repetitively; and jointly measuring the interference of the photons emitted from the quantum nodes to be linked.

The ion-photon entanglement is generated inside the quantum nodes to be connected, and the photons are then directed to a middle site for a joint measurement of their interference, the entanglement link between the quantum nodes (the entanglement between ions from the quantum nodes to be connected) are heralded via certain outcome of the measurement. The success probability of the entanglement links is much smaller than unity, thus the procedure, including ion-photon entanglement generation and joint measurement, will be repeated a lot of times.

In an exemplary embodiment, before establishing entanglement links between quantum nodes, the method further includes:

coherently transferring ions carrying quantum information to the storage levels.

In an exemplary embodiment, during the establishment of the entanglement links between quantum nodes, if the ions carrying quantum information are not on the storage levels, or the ions used for entanglement links establishment are not on the operational levels, the present disclosure further includes coherent transfer of the ion states, that is, coherently transfer ions carrying quantum information to the storage levels and coherently transfer the ions used for establishment of entanglement links to the operational levels in advance, using an individual addressing system. The coherence can be maintained by using the simultaneous transfer method mentioned above.

Figure 11:
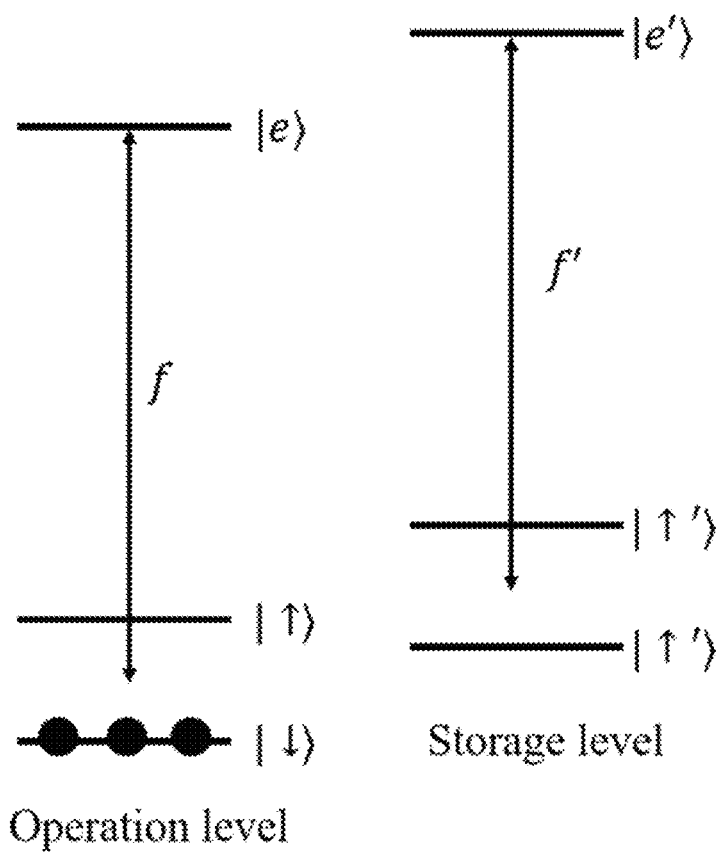
FIG. 11 is a schematic diagram of operational levels and storage level according to an embodiment of the present disclosure.
Figure 12:
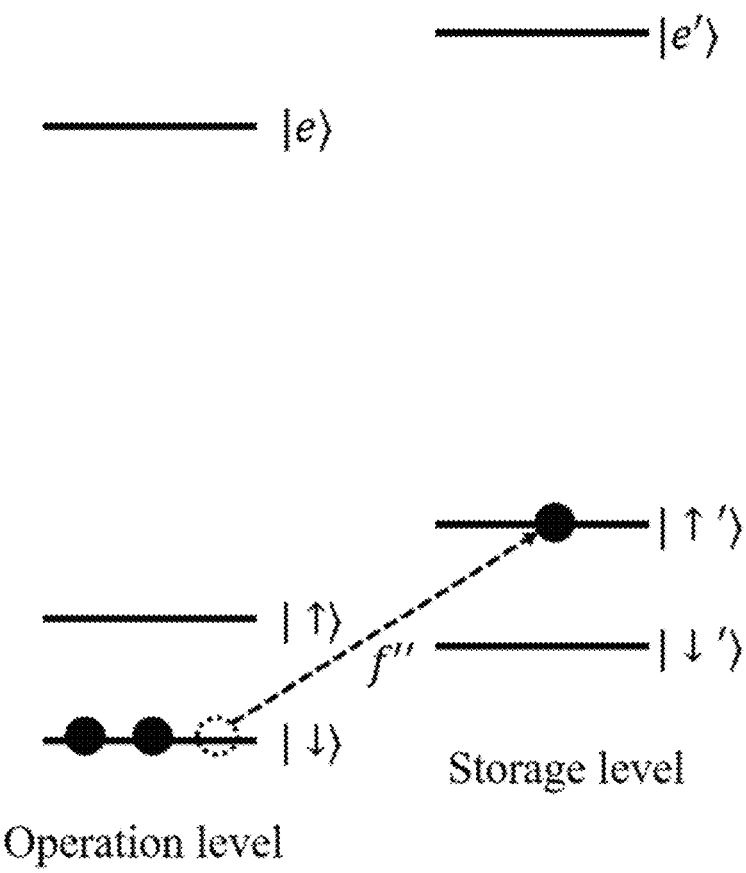
FIG. 12 is a schematic diagram of coherent transfer according to an embodiment of the present disclosure.
Figure 13:
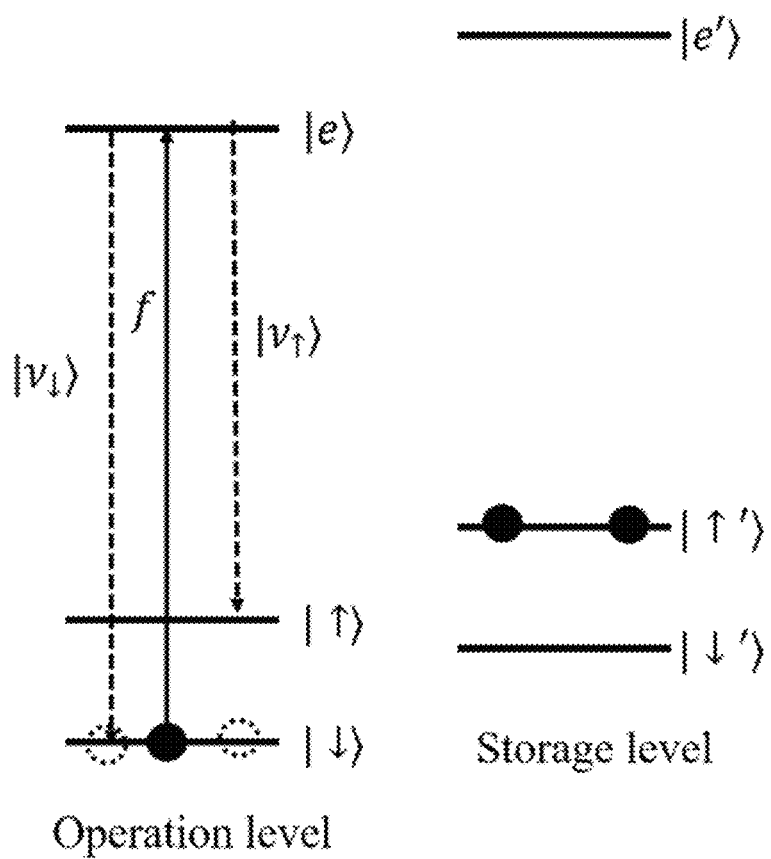
FIG. 13 is a schematic diagram of constructing entanglement between ions and photons according to an embodiment of the present disclosure.

FIG. 11 is a schematic diagram of ions at the operational levels according to an embodiment of the present disclosure. As shown in FIG. 11, all ions are at the operational levels. FIG. 12 is a schematic diagram of coherent transfer of ions according to an embodiment of the present disclosure. As shown in FIG. 12, ions are coherently transferred from the operational levels to the storage levels. FIG. 13 is a schematic diagram of constructing ion-photon entanglement on the operational levels according to an embodiment of the present disclosure.

In all of the embodiments and/or implementations above and below, functions of a certain set of energy levels as operational levels or storage levels may be dynamically switched according to actual circumstances. For example, a set of energy levels may serve as operational levels during a certain time and as storage levels during other time.

Figure 14:
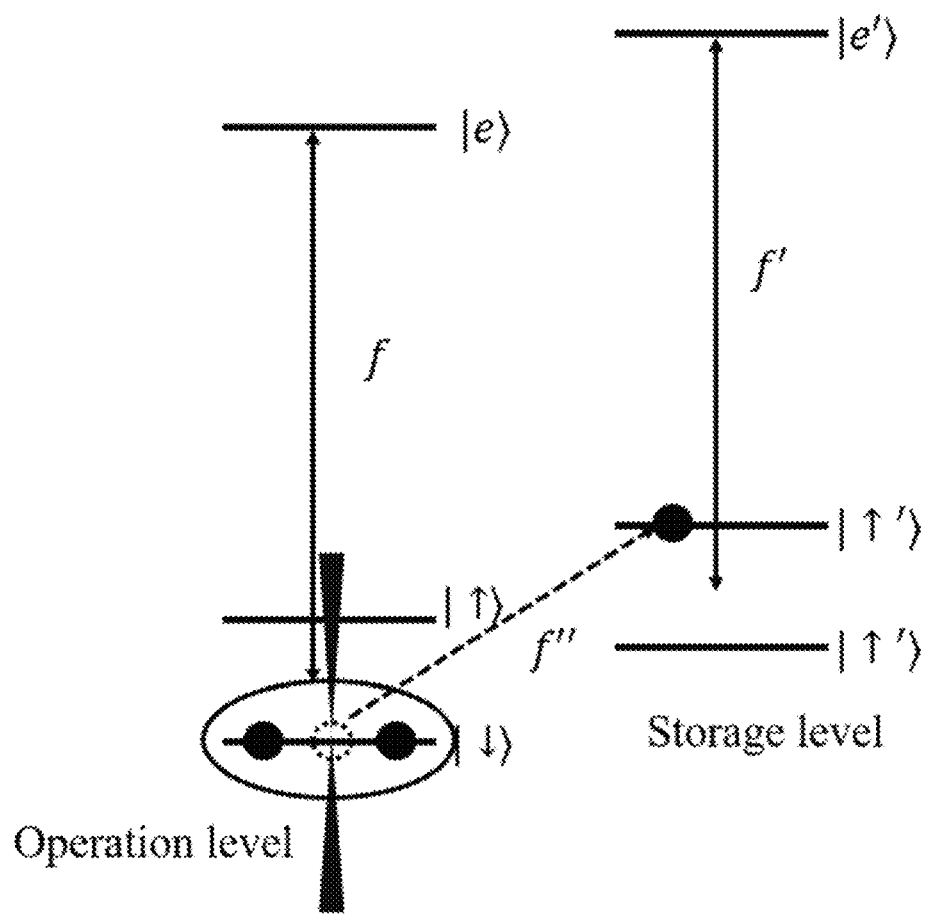
FIG. 14 is a schematic diagram of transferring ions at different spatial positions according to an embodiment of the present disclosure.
Figure 15:
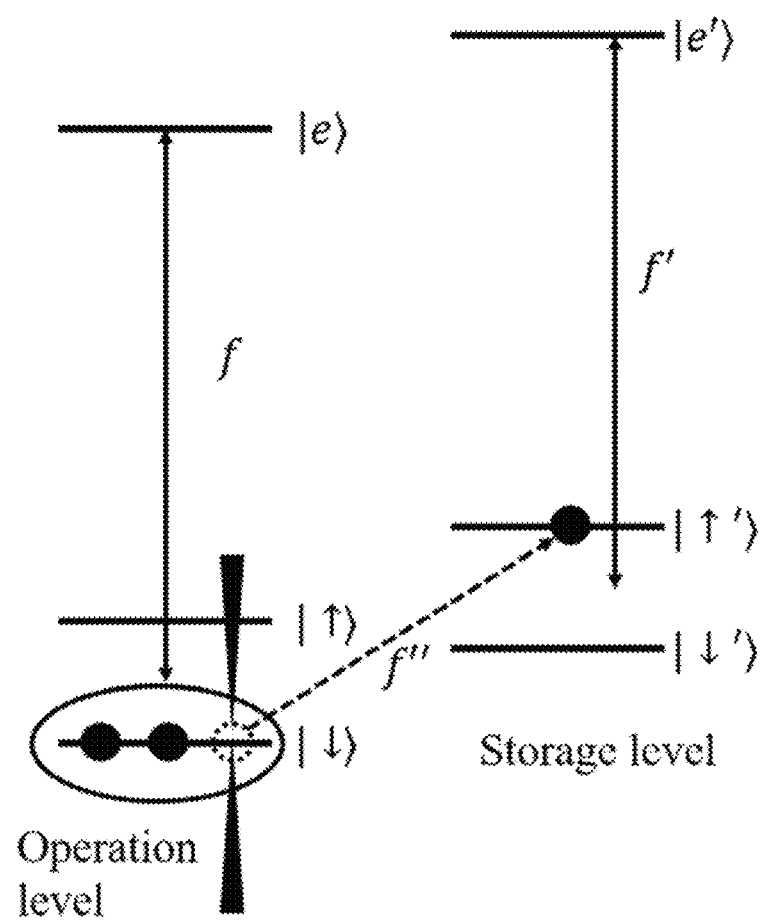
FIG. 15 is another schematic diagram of transferring ions at different spatial positions according to an embodiment of the present disclosure.

The embodiment of the present disclosure achieves the flexibility of transferred ions using the individual addressing technique. An individual addressing system has a spatial resolution for a single ion, which means that the transfer laser can transfer only one ion without affecting others. The embodiment of the present disclosure may selectively transfer ions at any spatial position in quantum nodes using individual addressing. FIGS. 14 and 15 are schematic diagrams of transferring ions at different spatial positions according to an embodiment of the present disclosure. As shown in the figures, the spatial positions of transferred ions according to an embodiment of the present disclosure are controllable on demand, which provides flexibility to the construction of the quantum network.

To sum up, according to the embodiment of the present disclosure, for an ion having at least two sets of long-lived energy levels, two sets of the long-lived energy levels are set as operational levels and storage levels respectively, and a quantum network is constructed using the ions on the operational levels and ions on the storage levels. The establishment of the entanglement links between quantum nodes is achieved by using the ions on the operational levels, and the quantum information is protected by using the ions on the storage levels. The excitation and emission frequency of the operational levels and the storage levels are different, the frequency difference is larger than 20 GHz. In other words, the ions for ion-photon entanglement generation and the ions carrying quantum information are at spectrally separated sets of energy levels during the establishment of the entanglement links, thus the crosstalk error is significantly suppressed. The long-lived energy levels include energy levels with an energy level lifetime Ionizer than one millisecond. Each set of the long-lived energy levels include at least two sublevels for encoding quantum information. In addition, the coherent transfer of the ion states using the individual addressing provides flexibility to the embodiment of the present disclosure, which means the positions and amounts of the transferred ions can be dynamically tunned on demand.

An embodiment of the present disclosure further provides a quantum network.

Figure 16:
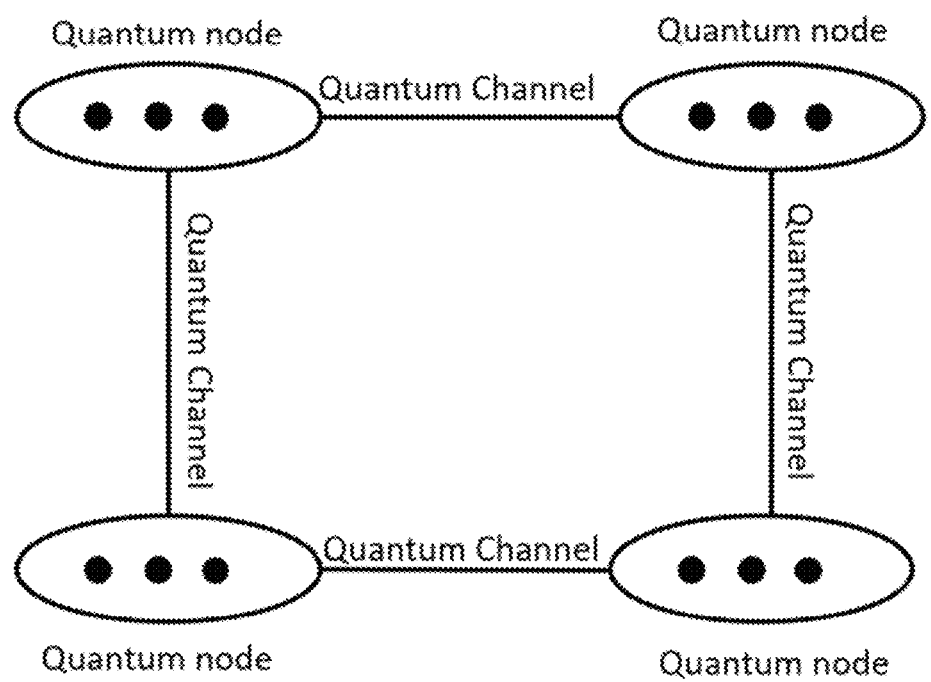
FIG. 16 is a block diagram of composition of a quantum network according to an embodiment of the present disclosure.

FIG. 16 is a block diagram of a composition of a quantum network according to an embodiment of the present disclosure. As shown in FIG. 16 the quantum network includes quantum nodes and quantum channels.

The quantum nodes include:

At least one ion for establishment of entanglement links between quantum nodes and at least on ion carrying quantum information.

The at least one ion for establishment of entanglement links are at the operational levels during the establishment of the entanglement links.

The at least one ion carrying quantum information are at the storage levels during the establishment of the entanglement links.

The operational levels and the storage levels are two sets of long-lived energy levels of the same species of ions. The ions have at least two sets of long-lived energy levels, and are coherently transferrable between different sets of long-lived energy levels. The operational levels carry ancillary qubits, and the storage levels carry data qubits. The long-lived energy levels have lifetimes longer than a first preset multiple of a time scale for quantum operations. Each set of the long-lived energy levels include at least two sublevels for encoding quantum information. The excitation and emission frequency difference between the operational levels and the storage levels is larger than a second preset multiple of a reciprocal of the quantum operational, time scale.

In an exemplary embodiment, the first preset multiple of the time scale tier quantum operations is one millisecond.

In an exemplary embodiment, the second preset multiple of a reciprocal of the quantum operational time scale is 20 GHz.

Those skilled in the art can understand that all or some of the steps, systems and functional modules/units in the devices disclosed above can be implemented as software, firmware, hardware and appropriate combinations thereof in a hardware implementation, a division between functional modules units mentioned in the above description does not necessarily correspond to the division of physical components. For example, a physical component may have multiple functions, or a function or a step may be cooperatively performed by several physical components. Some or all of the components may be implemented as software executed by a processor, such as a digital signal processor or a microprocessor, or as hardware, or as an integrated circuit, such as an application specific integrated circuit. Such software may be distributed on computer-readable media, which may include computer storage media (or non-transitory media), and communication media (or transitory media). As well known to those of ordinary skill in the art, the term "computer storage media" includes volatile and nonvolatile, removable and non-removable media implemented in any method or technology for storing information such as computer readable instructions, data structures, program modules or other data. Computer storage media include but are not limited to RAM, ROM, EEPROM, flash memory or other memory technologies, CD-ROM, digital versatile disk (DVD) or other optical disk storage, magnetic boxes, magnetic tapes, magnetic disk storage or other magnetic storage devices, or any other media that can be used to store desired information and can be accessed by computers. Furthermore, it is well known to those of ordinary skill in the art that communication media typically include computer readable instructions, data structures, program modules or other data in a modulated data signal such as a carrier wave or other transmission mechanism, and may include any information delivery media.

What is claimed is:

1. A dual-type qubits system, comprising: first-type qubits and second-type qubits, wherein
the first-type qubits and the second-type qubits, with different functions, are implemented by a same species of ions, the ions have at least two sets of long-lived energy levels; the first-type qubits and the second-type qubits, carried by different sets of long-lived energy levels of the ions, are coherently convertible to each other.

2. The dual-type qubits system according to claim 1, wherein the ions at different sets of long-lived energy levels have different excitation and emission frequencies,
wherein the different excitation and emission frequencies have a frequency difference larger than 20 GHz.

3. The dual-type qubits system according to claim 1, wherein the first-type qubits are ancillary qubits, and the second-type qubits are data qubits.

4. The dual-type qubits system according to claim 3, wherein at least one set of the long-lived energy levels are operational levels and at least one other set of the long-lived energy levels are storage levels.

5. The dual-type qubits system according to claim 4, wherein the ions implementing the ancillary qubits are on the operational levels and perform operations which comprise laser cooling, giant state preparation and detection, and quantum gates, and photon assisted entanglement generation; the ions implementing the data qubits are on the storage levels, decoupled from the operations, and protect coherence of the data qubits from disruptive operations.

6. The dual-type qubits system according to claim 4, wherein when ancillary operations are performed on the ancillary qubits, the ions implementing ancillary qubits comprise ions for performing ancillary operations and the ions implementing data qubits comprise ions for carrying quantum information; and between the ancillary operations, the data qubits and the ancillary qubits are coherently convertible to each other through laser transitions between the storage levels and the operational levels.

7. The dual-type qubits system according to claim 5, wherein when ancillary operations are performed on the ancillary qubits, the ions implementing ancillary qubits comprise ions for performing ancillary operations and the ions implementing data qubits comprise ions for carrying quantum information; and between the ancillary operations, the data obits and the ancillary qubits are coherently convertible to each other through laser transitions between the storage levels and the operational levels.

8. The dual-type qubits system according to claim 4, wherein the ions are ytterbium-171 ions.

9. The dual-type qubits system according to claim 1, wherein the ions are ytterbium ions, calcium ions, barium ions, or isotopes thereof.

10. The dual-type qubits system according to claim 8, wherein for the ytterbium-171 ions, the two sets of long-lived energy levels are ground-state levels $^2S_{1/2}$ and metastable levels $^2F_{7/2}$, respectively.

11. The dual-type qubits system according to claim 10, wherein for the ytterbium ions, the ground-state levels $^2S_{1/2}$ are the operational levels and the metastable levels $^2F_{7/2}$ are the storage levels.

12. A method for constructing a quantum network, comprising:
setting two sets of long-lived energy levels of an ion having at least two sets of long-lived energy levels as operational levels and storage levels respectively; and
constructing a quantum network using the ions on the operational levels and the ions on the storage levels;
wherein the long-lived energy levels comprise energy levels with an energy level lifetime longer than a first preset multiple of a time scale for quantum operations, and each set of the long-lived energy levels comprises at least two sublevels for encoding quantum information.

13. The method for constructing a quantum network according to claim 12, wherein constructing the quantum network using the ions on the operational levels and the ions on the storage levels comprises:
establishing entanglement links between quantum nodes using the inns on the operational levels, which carry ancillary qubits,
wherein during the establishment of the entanglement links, ions carrying quantum information are at the storage levels, which carry data qubits, for protection.

14. The method for constructing a quantum network according to claim 13, wherein establishing the entanglement links between the quantum nodes using the ions on the operational levels comprises:
generating entangled states between the ions at the operational levels and photons repetitively; and
jointly measuring interference of the photons emitted from the quantum nodes to be linked.

15. The method for constructing a quantum network according to claim 14, wherein before establishing the entanglement links between the quantum nodes using the ions on the operational levels, the method further comprises:
coherently transferring the ions carrying the quantum information to the storage levels.

16. The method for constructing a quantum network according to claim 12, wherein an excitation and emission frequency difference between the operational levels and the storage levels is larger than a second preset multiple of a reciprocal of the quantum operational time scale.

17. The method for constructing a quantum network according to claim 13, wherein an excitation and emission frequency difference between the operational levels and the storage levels is larger than a second preset multiple of a reciprocal of the quantum operational time scale.

18. The method for constructing a quantum network according to claim 14, wherein an excitation and emission frequency difference between the operational levels and the storage levels is larger than a second preset multiple of a reciprocal of the quantums operational time scale.

19. The method for constructing a quantum network according to claim 15, wherein an excitation and emission frequency difference between the operational levels and the storage levels is larger than a second preset multiple of a reciprocal of the quantum operational time scale.

20. A quantum network, comprising: quantum nodes and quantum channels, wherein the quantum nodes comprise:

at least one ion for establishing entanglement links between the quantum nodes and at least on ion for carrying quantum information;

wherein the at least one ion for establishing the entanglement links are at operational levels during the establishment of the entanglement links; and the at least one ion for carrying the quantum information are at storage levels during the establishment of the entanglement links;

wherein the operational levels and the storage levels are two sets of long-lived energy levels of the same species of ions; the ions have at least two sets of long-lived energy levels, and are coherently transferrable between different sets of long-lived energy levels; the operational levels carry ancillary qubits, and the storage levels carry data qubits: the long-lived energy levels have lifetimes longer than a first preset multiple of a time scale for quantum operations, each set of the long-lived energy levels comprise at least two sublevels for encoding quantum information; and the excitation and emission frequency difference between the operational levels and the storage levels is larger than a second preset multiple of a reciprocal of the quantum operational time scale.

* * * * *